United States Patent [19]

Dishart

[11] Patent Number: 4,721,578
[45] Date of Patent: Jan. 26, 1988

[54] PERFLUORINATED POLYPROPYLENE OXIDE COMPOUNDS FOR VAPOR PHASE HEAT TRANSFER PROCESSES

[75] Inventor: Kenneth T. Dishart, Wilmington, Del.

[73] Assignee: E. I. Du Pont de Nemours and Company, Wilmington, Del.

[21] Appl. No.: 915,415

[22] Filed: Oct. 6, 1986

[51] Int. Cl.$^4$ ................................. C09K 5/04
[52] U.S. Cl. ........................ 252/78.1; 568/615; 165/1
[58] Field of Search .............. 252/78.1; 568/615; 165/1

[56] References Cited

U.S. PATENT DOCUMENTS

| | | | |
|---|---|---|---|
| 3,322,826 | 5/1967 | Moore | 260/544 F |
| 3,866,307 | 2/1975 | Pfahl, Jr. et al. | 228/34 |
| 3,904,102 | 9/1975 | Chu et al. | 228/242 |
| 4,032,033 | 6/1977 | Chu et al. | 228/201 |
| 4,549,686 | 10/1985 | Sargent et al. | 228/37 |

*Primary Examiner*—Robert Wax
*Attorney, Agent, or Firm*—James E. Shipley

[57] ABSTRACT

A vapor phase heat transfer process which uses low molecular weight fully fluorinated hexafluoropropylene oxide (HFPO) oligomers having the formula:

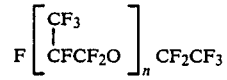

where n is 9 or less, as heat transfer mediums.

12 Claims, No Drawings

PERFLUORINATED POLYPROPYLENE OXIDE COMPOUNDS FOR VAPOR PHASE HEAT TRANSFER PROCESSES

BACKGROUND OF THE INVENTION

The present invention relates to low molecular weight fully fluorinated hexafluoropropylene oxide (HFPO) oligomers of the formula:

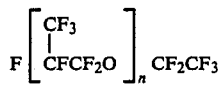

where n is 1 to 9, for use as heat transfer media in vapor phase heat transfer processes which use contact with heated vapor to raise the temperature of a workpiece.

Generally, vapor phase heat transfer or direct contact condensation heating involves boiling a liquid to generate a body of hot saturated vapor in equilibrium with the boiling liquid. The liquid should have a boiling point at least equal to the temperature at which a soldering, fusing, brazing, curing or other similar heat transfer operation is to be performed. The workpiece to be heated is immersed in the hot saturated vapor generated by the pool of boiling liquid. The vapor, at the temperature of the boiling liquid, envelops the workpiece and begins to condense, giving up its latent heat of vaporization. The workpiece is thereby heated rapidly and uniformly to the temperature of the boiling liquid and the soldering, fusing, brazing, curing or other heat transfer process occurs.

Vapor phase soldering is a special case of the general process of vapor phase heat transfer. In a reflow soldering process, heat melts solder which has been previously applied to the desired locations on a workpiece. Although the present invention is not to be construed as limited to soldering, its background is most readily understood in the context of soldering.

In a vapor phase heat transfer operation and, in particular, a vapor phase soldering process, the heat transfer medium should have certain characteristics. It is important that the medium have the correct boiling point so as to melt the solder without damaging the workpiece. It should also have high thermal and chemical stability so as to withstand long periods of boiling while in contact with many different metals and organic compounds, be compatible with the work assembly itself, have low heats of vaporization so as to evaporate rapidly from the surface of the work assembly after the soldering is complete, and not leave undesirable residues after evaporation from the work assembly. Generally, heat transfer liquids should produce vapors that are heavier than air so as to facilitate their confinement and thereby help control losses during operation. Nonflammability of the heat transfer medium is particularly desirable to avoid fires. Low flux solubility is important to avoid excessive flux removal during heat-up of the work assembly. Work pieces usually enter and exit an apparatus designed for vapor phase soldering through openings through which some loss may occur to the surrounding work area of both the heat transfer medium and by-products which may be formed during the prolonged boiling of the liquid; therefore, low toxicity of both the liquid and any by-products is required. In addition, properties of the heat transfer medium should make it possible to minimize these losses for reasons of economy as well as safety.

Heat transfer media currently used in vapor phase heat transfer processes have the afore described characteristics to varying degrees. The following references describe various heat transfer media and processes.

U.S. Pat. No. 3,866,307 (1975) to Pfahl discloses that fluorocarbons such as fluorinated polyoxypropylene can be used as heat transfer liquids for vapor phase heat transfer operations. Two specific trademarked products designated "Freon" E5 and "Freon" E4 which were sold by E.I. duPont de Nemours & Co. are described.

U.S. Pat. No. 4,032,033 (1977) to Chu discloses an electrochemically fluorinated amine product sold by 3M Company under the tradename "Fluorinert FC-70" for use as a heat transfer liquid.

U.S. Pat. No. 4,032,033 also discloses the use of multiple heat transfer media in vapor phase heat transfer applications. Secondary media interposed between a body of hot primary vapor and the atmosphere can reduce the losses of primary vapor into the surrounding work area. The secondary medium must have a vapor less dense than the saturated vapor formed from the primary heat transfer liquid but more dense than air at working temperatures and pressures.

U.S. Pat. No. 4,549,686 (1985) to Sargent claims a method of soldering in which the vapor bath is composed predominantly of perfluorotetradecahydrophenanthrene ($C_{14}F_{24}$), tradename "Flutec PP11".

While the heat transfer media described in the foregoing references are useful in vapor phase heat transfer processes, it is desirable to use a heat transfer medium with improved characteristics, especially one which has lower flux solubility and one which forms smaller quantities of toxic by-products during prolonged use.

SUMMARY OF THE INVENTION

A process for transferring heat to a workpiece has been discovered comprising contacting said workpiece with a vapor phase heat transfer medium comprising fully fluorinated hexafluoropropylene oxide oligomers having the formula:

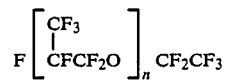

where n is 1 to 9, and, thereafter, removing said workpiece from contact with said vapor phase heat transfer medium. The use of such a heat transfer medium in a vapor phase heat transfer process represents a significant improvement in vapor phase techniques for soldering, fusing, brazing and curing.

Generally, the heat transfer medium of the instant invention removes less flux during heat-up, allows reduced usage of the heat transfer medium itself, allows cleaner and more efficient operation, and has better thermal and hydrolytic stability and lower toxicity and less corrosive by-product formation than other heat transfer mediums previously available.

The heat transfer medium of the instant invention may be used in vapor phase heat transfer equipment which uses single or multiple fluids/vapors and is particularly useful as the primary heat transfer fluid.

DETAILED DESCRIPTION OF THE INVENTION

As used herein, vapor phase heat transfer means any operation, such as soldering, fusing, brazing or curing, which uses a saturated vapor generated by a pool of boiling liquid to raise the temperature of a workpiece or work-assembly to a desired temperature.

By vapor phase heat transfer medium is meant either the liquid or the saturated vapor, generated by boiling the liquid, which is used in a vapor phase heat transfer operation.

By workpiece is meant the item to which the heat from the vaporized heat transfer medium is transferred. Examples of workpieces include items on which a soldering, brazing, fusing, curing, heating operation is to be performed.

Oligomers of this invention can be prepared by the metal fluoride-solvent catalyzed polymerization of hexafluoropropylene oxide, as described in U.S. Pat. No. 3,322,826 (1967) to Moore, and incorporated herein by reference, giving a mixture of the oligomer acid fluorides, which are then converted to a mixture of the desired oligomers in a separate process involving decarbonylation of the acid fluoride end groups in the presence of a catalyst. The resulting mixture is then separated into the individual oligomers by distillation. The decarbonylation process step can be carried out as described in U.S. Pat. No. 3,985,810 (1976) to von Halasz et al, which is incorporated herein by reference.

Generally, a vapor phase heat transfer operation uses a primary liquid which has a boiling point at atmospheric pressure at least equal to the temperature at which a soldering, fusing, brazing, or other heat transfer operation is to be performed which is boiled to establish a body of hot saturated primary vapor having a density greater than that of air at atmospheric pressure. The article on which the heat transfer operation is to be performed is passed through the body of hot saturated vapor. This hot saturated vapor condenses on the article and the latent heat of vaporization of the condensing vapor heats the article to the temperature required for the soldering, fusing or brazing operation. The article or workpiece is allowed to contact the vapor for a sufficient time period for the heat transfer operation to be completed. Thereafter, the article or workpiece is withdrawn from the body of vapor and allowed to cool. U.S. Pat. Nos. 3,866,307 (1975) and 3,904,102 (1975) to Pfahl, et al, and Chu, et al., respectively, disclose methods of soldering, fusing or brazing using vapor phase heat transfer processes and are incorporated herein by reference. The heat transfer medium of the instant invention can be used in these processes.

U.S. Pat. No. 3,904,102 discloses the use of a primary and a secondary vapor in a vapor phase heat transfer operation. The secondary vapor has a density intermediate that of the primary vapor and the atmosphere and is floated on the body of primary vapor to reduce losses of the primary vapor, which is usually more expensive, to the atmosphere. Depending upon the selection of the alternate medium, the heat transfer medium of the instant invention could be used as either the primary or secondary vapor.

According to the instant invention, fully fluorinated polypropylene oxide oligomer fluids with the following general formula:

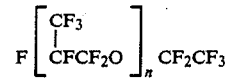

where $n=4$ to 9, are preferred in vapor phase heat transfer operations. Generally, the boiling point of these oligomers increases from about 180° C. to about 310° C. as "n" increases from 4 to 9. Isolation and subsequent use of each oligomer at atmospheric pressure allow saturated vapors to be generated above the respective boiling liquid oligomers at discrete temperatures.

The fully fluorinated polypropylene oxide oligomer of the instant invention wherein $n=5$ has a boiling point of 222° C. and is more preferred because it will reflow the common 60 tin/40 lead solders. In addition, it has surprisingly low solubility for rosin flux at its boiling point. This is beneficial because heat transfer mediums with high flux solubility remove more flux from the workpiece during heat-up compared to heat transfer mediums with lower flux solubility. Correspondingly, as increasing amounts of flux are removed, soldering defects usually increase due to an insufficient amount of flux being present when the solder reaches its melting temperature. To compensate for this loss of flux, excessive flux is often applied to the workpiece which causes more rapid flux buildup in the boiling liquid, deposition of flux on apparatus heaters and, consequently more frequent shutdowns of the operation for removal of flux residues.

The fully fluorinated polypropylene oxide oligomer of this invention wherein $n=6$ has a boiling point of 250° C., and pour point of about $-80°$ C., and is particularly preferred because it will reflow high temperature solders, such as 100 (wt. %) Sn, 95 Sn/5 Ag, 60 Pb/40 Sn and others, which provide solder joints of high thermal shock and stress resistance specifically suited to electronic circuit assemblies designed for high reliability under severe operational conditions.

The oligomer of this invention where $n=4$ has a boiling point of about 180° C. and is useful because it will reflow low temperature solders, such as 100 In and 70Sn/18 Pb/12 In, and has utility for curing thermoset resin systems.

Oligomers of this invention wherein $n=7$ to 9 provide discrete boiling points between 270° C. and 310° C. and provide excellent utility for soldering, fusing and brazing operations which require temperatures in this range.

It has also been found that with the oligomers of the instant invention, the formation of the toxic by-product perfluoroisobutylene (PFIB) during the course of the evaporation/condensation cycle in a vapor phase heat transfer process is significantly less than was possible with previously known heat transfer media.

Further detailed description of the invention is illustrated in the following non-limiting examples:

EXAMPLE 1

The fully fluorinated hexafluoropropylene oxide oligomer where $n=5$ was used as the heat transfer medium in a HTC Model IL-6 continuous vapor phase soldering machine (manufactured by the HTC Corporation Concord, Mass.) in two separate soldering test cases. The Model IL-6 is a single heat transfer medium (primary fluid only) machine which employs a conveyor belt to transport workpiece assemblies into, through and out of the vapor zone. Previously applied solder and flux, in the form of paste or preforms on the assemblies, melts, reflows and solidifies upon cooling to make the solder joint electrical connections. The machine is equipped with a water cooled heat exchanger system and a filter which are operated during shutdown to rapidly cool the hot oligomer fluid and to remove suspended flux residues and other particulate material from the fluid.

CASE 1

The IL-6 unit was thoroughly cleaned to remove residues and traces of the previously used fluid from the boil sump and filter and heat exchanger areas, and a new filter element was installed. The oligomer fluid of this invention where n=5, was poured into the boil sump. The unit was brought up to operating temperature briefly and then put in cool-down mode to fill the filter and heat exchanger system with the fluid. Additional fluid was added to bring the fluid level in the boil sump to the full mark and the unit was brought again to operating temperature and the soldering test started with a belt speed of 100 inches per minute.

Pin connector assemblies, comprising a rectangular ceramic capacitor chip with gold plated pins mounted through holes in the chip and set in a metal base, were passed through the machine to reflow a 62 Sn/36 Pb/2 Ag solder alloy with a rosin flux (RMA). The solder/flux was in place on the assemblies as ring preforms around each pin at the chip hole opening and as paste at the chip and metal base contact points. A total of 6244 pin connector assemblies were soldered, over a 9 day period, involving 57 hours of machine operation with the oligomer fluid. At the end of each day's operation the unit was placed in cool-down mode and the fluid filtered and additional fresh fluid added, if needed, to reach the full level mark.

All solder preforms and pastes on visual inspection were found to have properly reflowed and all solder connections exceeded specifications for strength and electrical performance. A few pin connectors were rejected for other reasons, mainly missing or not properly placed solder ring preforms.

Total consumption of the oligomer fluid amounted to 18.25 lbs. based on the daily make-up additions over the 9 days of operation; fluid was consumed at a rate of 2.03 lbs/day.

The recovered oligomer fluid drained from the unit had only a slight yellow discoloration and slight haze; the filter element, when removed, showed no discoloration and no particles of degraded rosin flux residues.

CASE 2

The IL-6 unit was thoroughly cleaned as in Case 1 and a new filter was weighed and installed. A specially designed cover was installed over the boil sump with an observation window and ports for temperature probes and fluid make-up additions. The oligomer fluid of this invention where n=5, was weighed and poured into the boil sump. The unit was operated briefly to fill the filter and heat exchanger system and then more fluid was added to reach the fluid level full mark. A total charge of 44.65 pounds of oligomer fluid was required to fill the unit. The unit was then brought up to operating temperature with a conveyor belt speed of 60 inches per minute and operated for a continuous 48 hours in a simulated production soldering of printed wiring boards as described below.

Glass-epoxy boards, 50 mils thick and 5.5 inches square, with a printed copper and tin plated circuit pattern on one side comprising a large number of thru-hole and surface mount soldering positions, were used. The boards were screen printed with a 63 Sn/37 Pb solder alloy, RMA flux solder paste, depositing an average of 0.8 grams of the paste on each board. No components were mounted on the boards. At the start of the test 400 of the above described boards were screen printed and individually passed through the IL-6 unit to reflow the solder. The same 400 boards were then, individually, recycled through the unit simulating a normal round-the-clock work schedule. After 24 hours the above set of boards was replaced with a new set of 400 screened boards with fresh solder paste which were reflowed and recycled in the same manner as the first set. At exactly 48 hours of operation, the power to the heaters was turned off and the unit put in cool-down mode. All fluid in the unit was recovered and accounted for by weight.

No additions of the oligmer fluid were made during the 48 hours of operation. Recovered fluid at the end of the test amounted to 38.06 pounds giving a fluid consumption of 6.59 pounds or 0.137 pounds per hour.

The recovered oligomer fluid was a pale yellow color with a slight haze and the used filter element showed no discoloration or particulate contamination. Visual inspection of the boil sump showed only a light deposition of rosin flux on the heater elements compared to the original condition at the start of the test.

The following table summarizes the overall results of the 48 hour tests for Case 2 described above.

TABLE

| 48 HOUR SOLDERING TEST | |
|---|---|
| Charge to fill unit | 44.65 lbs. |
| Fluid Additions During Test: | |
| Number Additions Made | 0 |
| Total Added | 0 lbs. |
| Fluid Consumed During Test: | |
| Total | 6.59 lbs |
| Rate | 0.137 lbs/hr |
| Number of Boards Processed | 9676 |
| Machine Operating Time: | |
| Processing Boards | 29.9 hrs. |
| Idle Time | 18.1 hrs. |
| Vapor Reflux Temperature: | |
| Start of Test | 222° C. |
| End of Test | 222° C. |

EXAMPLE 2

The method used for measurement of rosin flux solubility in vapor phase heat transfer media at their boiling points was adapted from the method of Wright et al, of AT&T Technologies, Inc. described in "Thermal and Soldering Characteristics of Condensation Heating Fluids" Proceedings of the Technical Program NEPCON West, Anaheim, Calif., February 1984. A sample of fresh water-white rosin used in rosin flux manufacture was obtained. A solution of 32 wt % of this water-white rosin in isopropyl alcohol was prepared having a density of 0.833 grams/ml. This solution was titrated in small increments into 500 grams of rapidly boiling heat transfer fluid contained in a 1000 ml. glass beaker which was fitted with a water cooled copper coil condenser at the top and sat on an electrically heated hot plate. Sufficient time was allowed between each incremental addition of rosin solution titrated to allow for isopropyl alcohol evaporation and for the rosin to dissolve in the heat transfer fluid. The rosin solubility limit end point was determined when a haze formed or when liquid rosin droplets failed to dissolve in the fluid.

EXAMPLE 3

Using the method of Example 2, solubility of rosin flux in the fully fluorinated hexafluoropropylene oxide oligomer of the present invention, where $n=5$, was measured.

The first increment of rosin solution titrant added to the boiling fluid of this invention did not dissolve, indicating a solubility below 0.01 wt %.

EXAMPLE 4

The oligomers where $n=5$, boiling point 222° C., and $n=6$, boiling point 250° C., were evaluated for general stability using a laboratory reflux test. The reflux apparatus consisted of a one-liter resin flask which was fitted with an interior water cooled copper coil and a glass top vented to the atmosphere and was placed in an electric heating mantle. Stainless steel and aluminum corrosion coupons, representing typical materials of construction, were suspended in the reflux and air space zones. To supply moisture, a small beaker of distilled water was suspended in the head space just above the cooling coil. The fluid (100 grams), along with copper metal turnings (0.5 grams) were placed in the flask and brought to a vigorous reflux. After 48 hours of reflux the two oligomer fluids were still clean and clear in appearance and the exposed metals and glass showed no evidence of corrosion or etching.

The oligomer where $n=9$, boiling point 310° C. was refluxed for four hours in a similar glass apparatus as described in this example with only the copper cooling coil and stainless steel coupons present and vented to a vessel containing water to provide humidification. No decomposition of the fluid or evidence of metal corrosion or glass etching was observed.

EXAMPLE 5

Analysis of gas samples for the presence of toxic perfluoroisobutylene (PFIB) was performed on a Varian 3700 gas chromatograph equipped with an electron capture detector. Standards prepared with 10 ppb PFIB were used to calibrate for any PFIB seen in the samples with a detection limit of 0.5 ppb. Three gas samples were obtained during the pin connector soldering assembly evaluation of the oligomer fluid were $n=5$, described in Case 1 of Example 1, by withdrawing the gas from above the condensing coils in the enclosed head space of the IL-6 unit at intervals during the soldering operation. Samples from the cylinder were then removed with a gas syringe and injected into the gas chromatograph. No PFIB was detected in any of these cylinder gas samples. In addition, during the laboratory reflux stability tests of the oligomer fluid $n=5$, described in Example 4, gas samples of the head space were obtained with a gas syringe and similarly injected into the gas chromatograph and no PFIB was detected.

EXAMPLE 6

The fully fluorinated hexafluoropropylene oxide oligomer where $n=6$ was poured into the boil sump of a HTC Model 912 batch vapor phase soldering machine and was heated to the boil to establish the primary reflux vapor zone. Trichlorotrifluoroethane was then slowly added to the boiling liquid to establish and maintain a secondary vapor zone above the primary zone. The primary vapor temperature was then stabilized at 249° C. Surface mount circuit board assemblies consisting of leaded chip carriers set on a corresponding printed wiring pad pattern bearing sufficient solder on printed wiring boards, were lowered into the secondary and then the primary vapor zones and then removed. The high temperature solder alloy composition used in one test case was 95 Sn/5 Sb, melting range 233° C. to 240° C., and in a second test case was 96.5 Sn/3.5 Ag, melting point 221° C. On visual inspection all solder alloys had reflowed and all joints were satisfactorily soldered.

I claim:

1. A process for transferring heat to a workpiece comprising
    contacting said workpiece with a vapor phase heat transfer medium comprising fully fluorinated hexafluoropropylene oxide oligomers having the formula:

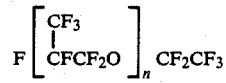

where n is 1 to 9, and, thereafter,
removing said workpiece from contact with said vapor phase heat transfer medium.

2. The vapor phase heat transfer process of claim 1 wherein the vapor phase heat transfer medium has $n=1$.
3. The vapor phase heat transfer process of claim 1 wherein the vapor phase heat transfer medium has $n=2$.
4. The vapor phase heat transfer process of claim 1 wherein the vapor phase heat transfer medium has $n=3$.
5. The vapor phase heat transfer process of claim 1 wherein the vapor phase heat transfer medium has $n=4$.
6. The vapor phase heat transfer process of claim 1 wherein the vapor phase heat transfer medium has $n=5$.
7. The vapor phase heat transfer process of claim 1 wherein the vapor phase heat transfer medium has $n=6$.
8. The vapor phase heat transfer process of claim 1 wherein the vapor phase heat transfer medium has $n=7$.
9. The vapor phase heat transfer process of claim 1 wherein the vapor phase heat transfer medium has $n=8$.
10. The vapor phase heat transfer process of claim 1 wherein the vapor phase heat transfer medium has $n=9$.
11. The vapor phase heat transfer process of claim 1 wherein the fully fluorinated hexafluoropropylene oxide oligomer is used as a primary heat transfer medium.
12. The vapor phase heat transfer process of claim 1 wherein the fully fluorinated hexafluoropropylene oxide oligomer is used as a secondary heat transfer medium.

* * * * *